United States Patent
Sennett et al.

(10) Patent No.: US 8,442,203 B2
(45) Date of Patent: May 14, 2013

(54) IDENTIFICATION AND DETERMINATION OF NON-PREEMPTABLE CALLS

(75) Inventors: DeWayne Allan Sennett, Redmond, WA (US); Brian Kevin Daly, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1223 days.

(21) Appl. No.: 12/057,029

(22) Filed: Mar. 27, 2008

(65) Prior Publication Data

US 2009/0245498 A1    Oct. 1, 2009

(51) Int. Cl.
*H04M 7/00* (2006.01)

(52) U.S. Cl.
USPC ........................................ 379/221.07; 379/45

(58) Field of Classification Search .. 379/207.01–207.1, 379/215.01, 45, 208.01, 221.01, 221.07
See application file for complete search history.

(56) References Cited

U.S. PATENT DOCUMENTS

| | | | | | |
|---|---|---|---|---|---|
| 5,717,749 | A | * | 2/1998 | Sneed et al. | 379/221.09 |
| 5,999,613 | A | * | 12/1999 | Nabkel et al. | 379/215.01 |
| 6,453,161 | B1 | * | 9/2002 | Touati et al. | 455/433 |
| 6,980,633 | B1 | * | 12/2005 | Henderson | 379/142.08 |
| 7,065,203 | B1 | * | 6/2006 | Huart et al. | 379/266.06 |
| 7,623,649 | B2 | * | 11/2009 | Goldman et al. | 379/221.08 |
| 8,249,236 | B2 | * | 8/2012 | Das et al. | 379/202.01 |
| 2007/0165800 | A1 | * | 7/2007 | Imura et al. | 379/100.12 |

* cited by examiner

*Primary Examiner* — Ahmad Matar
*Assistant Examiner* — Oleg Asanbayev
(74) *Attorney, Agent, or Firm* — Woodcock Washburn LLP (57) ABSTRACT

An active call between two parties can be marked as a non-preemptable call if one of the two parties is an authorized agency that desires to prevent premature termination of the call by a third party. The authorized agency sends a signal to a main switch to indicate that non-preemptable call status is desired. The newly established call status is then propagated to other nodes in the system to prevent premature call termination. Non-preemptable status can also be granted to some calls based on the destination of the called number, such as in 911 calls.

12 Claims, 6 Drawing Sheets

IDENTIFICATION AND DETERMINATION OF NON-PREEMPTABLE CALLS

TECHNICAL FIELD

The technical field generally relates to communications systems and more specifically relates to the determination and establishment of non-preemptable calls for public safety applications.

BACKGROUND

Part of the spectrum centered about 700 MHz is allocated for public use. Normally, public use calls are established, conducted, and terminated without interruption. However, during emergency situations, the available bandwidth may become fully used. In such a situation, some "high priority" users may be able to terminate an existing call by preemption. During preemption, a public safety call may simply be terminated to allow a "high priority" user to conduct a call. Yet, some existing public use calls are of such importance that they should be non-preemptable. Examples of calls that should be non-preemptable include voice calls to 911, data calls from a mobile medical unit providing emergency care to a hospital, voice or data calls between police and headquarters, and voice or data calls from deployed firemen to a fire control coordination center. Today, no method of determining or establishing a non-preemptable call status exists in the 700 MHz band or any other public use frequency band.

SUMMARY

The present invention includes a system and method to allow an authorized agency to identify and establish non-preemptable call status on a call that should be protected from premature termination by another user. The technique includes allowing the authorizing agency to mark an active call as a non-preemptable call by sending a signal to a main switch while the active call is in progress. A telecommunications server connected to the main telephone switch receives the requesting signal and tags the call as non-preemptable. The non-preemptable status is then propagated to other nodes and switches in the telecommunications system to prevent preemption by other would be users. The technique also includes a method to automatically establish a non-preemptable status based on the destination of the call.

BRIEF DESCRIPTION OF THE DRAWINGS

The foregoing and other objects, aspects and advantages of dynamic allocation of communications resources will be better understood from the following detailed description with reference to the drawings.

DETAILED DESCRIPTION OF ILLUSTRATIVE EMBODIMENTS

Figure 1:
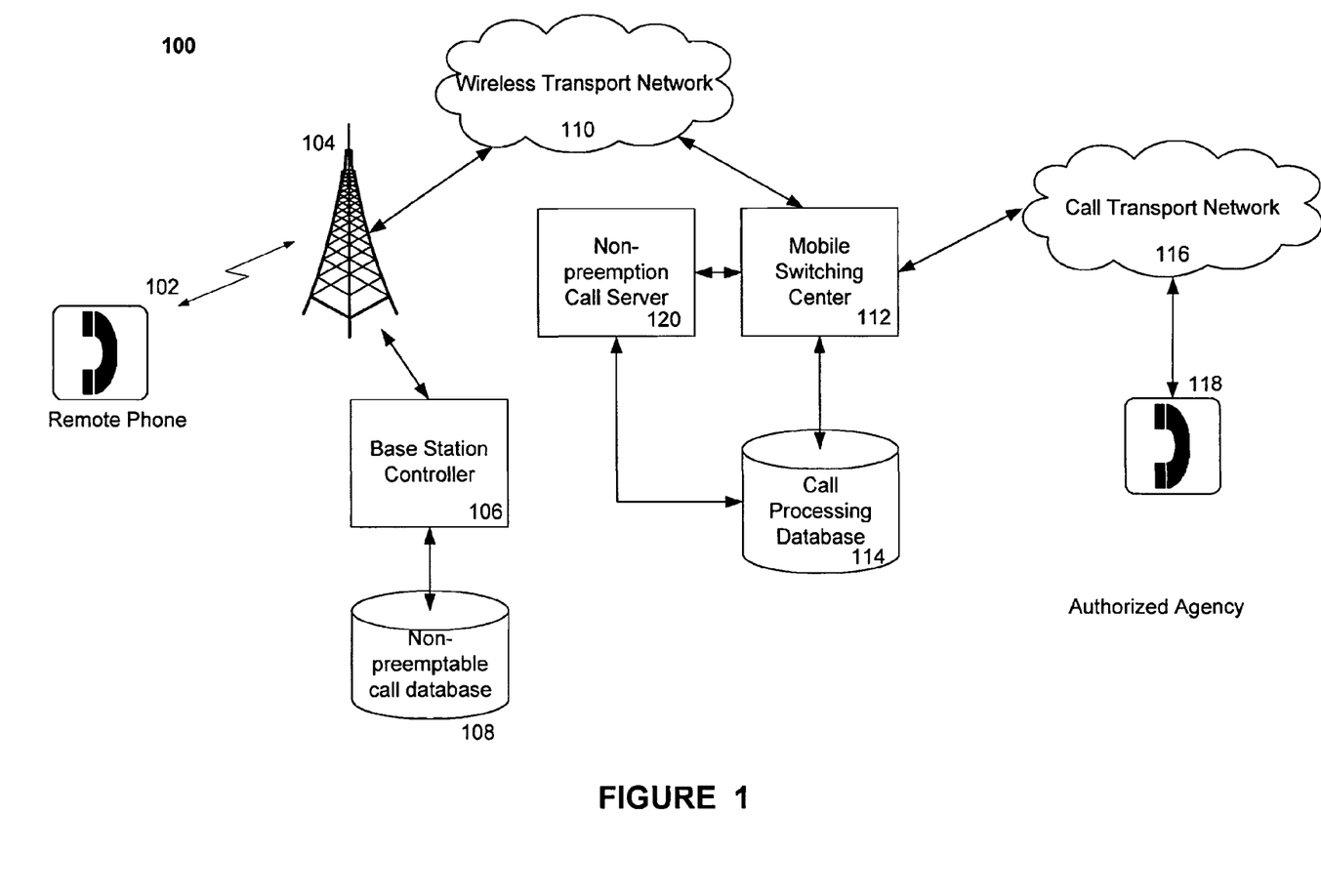
FIG. 1 is an example system diagram for non-preemptable call identification using a wireless system.

FIG. 1 is a diagram of an example system in which the invention may be practiced. FIG. 1 depicts a wireless system 100. But, the system could be any communications system used in public service. For example a standard Public Switched Telephone Network (PSTN) may be used as the system embodying the principles of the invention. A customized or secure communications network that may be used for public emergency communications services may also embody the present invention. In the present description a wireless network can serve as the basis for discussion of the aspects of the invention.

Returning to FIG. 1, a remote phone 102, can make a call, either data or voice or both to an authorized agency 116 for the purposes of public safety. The remote phone can be any of a mobile phone, a fixed phone, a computer terminal, or other telephone communication equipment or device. For example, an emergency call can be made by an individual to an authorized 911 calling center, here the 911 call may be pre-authorized as a non-preemptable call. In a different example, an individual can make an emergency call to a hospital requesting technical medical assistance from a trauma center. Here, the trauma center, responding in an authorized public responder, can authorize that the call be designated as a non-preemptable call. Authorizing agencies can include 911 message centers, trauma centers, hospitals, fire houses, police call centers, ambulance service providers, and the like. In the context of the invention, an authorizing agency 118 is an agency that has the authority and ability to designate a call as being non-preemptable. That is, the call is of such importance that the call is protected from early termination of the call by a third party. Such a call may be either a voice call or a data call.

To facilitate aspects of the invention in the wireless network, a call made to or by a remote phone 102 would pass through a base station tower 104 connected to a base station controller (BSC) 106. It is noted that the terminology BSC may normally be used in association with a Global System for Mobil Communications (GSM) based system. However, the invention is not limited to GSM systems. A Universal Mobile Telecommunications System (UTMS) has a cell tower controller mechanism referred to as a Radio Network Controller (RNC). All types of mobile systems that include cell tower controllers are considered applicable to the present invention. For the sake of simplicity, the term BSC will be used as an example cell tower controller mechanism for the functions of item 106. Returning to FIG. 1, a call placed by the remote phone 102 would then pass via the BSC 106, through the wireless transport network 110 to a mobile switching center (MSC) 112. Essentially, the MSC is the main switching point for the initiated call. Here, the call is routed to its destination with the aid of a call processing center server using a call processing database. The mobile switching center can then direct the call to the destination authorized agency 118. For the sake of simplicity, it is assumed the mobile switching center 112 delivers the call to the authorized agency 118 via the call transport network 116. This network may be either a wireless connection of a connection to a PSTN or other public or private network to access the authorized agency 118.

If the call is of such importance as to be designated as a non-preemptable call, the authorized agency can send a control signal from the end-point 118 back to the MSC 112 where the signal would be intercepted by the Non-Preemption Call Server (NCS) 120. The NCS 120 can be co-located with the MSC but can also be located remotely. The NCS 120 can accept the signal request, authenticate the requester, and mark the active call as a non-preemptable call. The NCS update the call processing database with the identity of the non-preemptable call. The NCS then also propagates the non-preemptable call details throughout the network 100 to inform all nodes and switching points, such as the MSC 112, the BSC 106, the non-preemptable call database 108, and the authorized agency node 118 that the active call is now a non-preemptable call. This notification of non-preemptable call status acts to prevent any third party from prematurely terminating the call. This effect results from the notified equipment rejecting attempts to terminate the call along the system path of the active call. It should be noted that not all nodes and switching points need be notified of the non-preemptable call status; only those nodes which can be useful in informing users or informing elements of the system that third party early termination of the protected call is forbidden.

Figure 2:
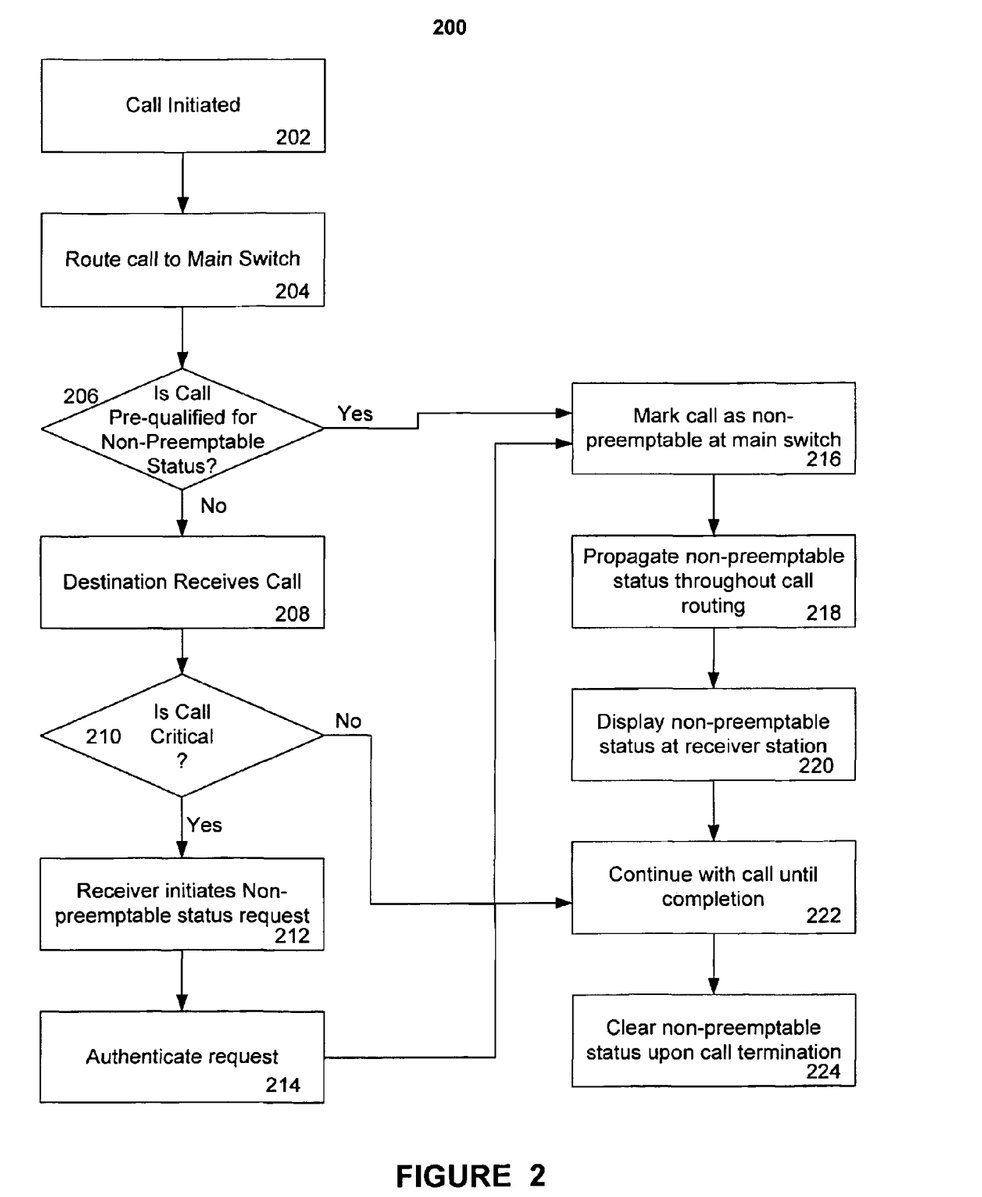
FIG. 2 is an example flow diagram for identification and establishment of non-preemptable status for a call.

FIG. 2 is a diagram of an example flow diagram of a method 200 which uses the architecture of FIG. 1. FIG. 2 assumes that the call is initiated from the remote phone 102. However, it should be well understood that aspects of the invention serve equally as well to a call that is initiated by the authorized agency 118 of FIG. 1. Referencing FIG. 2, a call is initiated at step 202 by a remote phone 102. The call is routed through the wireless transport network 110 to the main switching center 112 at step 204. At step 206, call parameters, such as call destination are examined, using the NCS 120 and the call processing database 114 to determine if the call is already qualified as a non-preemptable call based on the destination of the call (i.e. the number dialed). Such an instance can occur on calls to an authorized agency 118 such as a 911 call center that have a pre-existing qualification for non-preemptable call status. In such a circumstance, the call is automatically asserted to be non-preemptable because the of the restricted, high importance mode of use of the 911 call center. Optionally, other agencies, may also qualify for such non-preemptable call receipt status. In one embodiment, the processing at step 206 involves the MSC 112 comparing the incoming call to a list of non-preemptable agencies/call entries, possibly resident in the call processing database 114, and determining if the incoming call is already of the pre-existing qualification to be marked as having non-preemptable status. In this instance, the comparison of the incoming call destination to the list of non-preemptable agency call destinations that automatically qualify for non-preemptable call status can effectively generate a request that the active call be marked as a non-preemptable call. Other examples of automatically asserted non-preemptable call status destinations could be calls destined for specific trauma centers, hospitals, or government agencies that require automatic non-preemptable call status.

If the incoming call is already of the non-preemptable qualification status, then the call is marked as non-preemptable after step 206 branches to step 216. Then, at step 218, the non-preemptable status is propagated throughout the call routing switches and endpoints using the NSC in conjunction with the distribution capabilities of the MSC 112. For example, once a live call is identified as non-preemptable, then the non-preemptable call status information is sent by the NSC 120 via the MSC 112 and delivered to nodes throughout the network nodes utilized by the active call. Such nodes include the base station controller 106, the non-preemptable call database 108, and the authorized agency 118. The authorized agency may have nodes in the call transport network 116 that may need to have a record of the non-preemptable status of the active call. This propagation of status notification informs nodes of the entire end-to-end network that the call is non-preemptable and that any attempt to transfer resources to another call is prohibited. Also, if a call were to roam between cell sites, then the information status of the call would move from one cell to another cell as a result of the transfer from one BSC to another.

After the notification is provided in step 218, a display of non-preemptable status may optionally be displayed at any receiver station associated with the call at step 220. For example, if the receiver station of the authorized agency 118 is so equipped, the NCS 120, using the MSC 112, can supply a displayable notification that the call is already properly designated as the non-preemptable call. The call then continues until call termination at step 222. Upon termination in step 224, the non-preemptable status of the once-active call is cleared throughout the network nodes that we notified in step 218 so that call resources can be re-allocated as needed for the next call.

Returning the flow 200 at step 206, if the call is not of the type that is already designated as a non-preemptable call, then the method moves to step 208 where the call is completed to the destination (i.e. authorized agency 118 in the current example of FIG. 1). At the authorized agency 118, a determination is made as to whether the call is a critical one at step 210. A critical call may be assessed manually by an operator at the authorized agency. Typical examples may include a rescue worker at a hospital that receives a call from an ambulance in route to the hospital concerning a critically injured patient. A data or voice channel established to provide vital sign information to the hospital (authorized agency) may become so important that the hospital deems the call to be so critical that the call must not be lost due to preemption.

If the call is not of a critical nature then the step 210 flows to step 222 where the call goes to its normal completion and then termination. If the call is of the critical nature, then the method 200 flows to step 212 where the human operator of the received call manually initiates a non-preemptable status request for the active call. In this instance the human receiver at the authorized agency acts on the critical call assessment and makes a request that the system 100 mark the active call as non-preemptable.

The human operator of the received call may request non-preemptable status in a number of different ways according to the equipment he has available to him. In one embodiment, the operator at the authorized agency can have a hardware button on the receiving device that is being operated. Pressing the button can send a signal, via control or signaling channel to the MSC 112 that is routed to the NCS 120 that the call requires non-preemptable status. In another embodiment, the operator may use a softkey or a menu key on the receiving equipment that allows the operator to access a function which performs the same function as the above mentioned hardware button. One of skill in the art will recognize that there are many options to performing step 212 to achieve the objective of initiating a non-preemptable request.

After the request is sent in step 214, the NCS 120 authenticates the request at step 214. Authentication involves ensuring that only an authorized agency 118 may mark a call with a non-preemptable status. The authentication request of step 214 may be as simple as sending an authentication code in the request. Alternatively, the authentication request may involve checking that the agency or specific operator is authorized by using tokens, encryption, passwords or other techniques that are well known in the art.

After the request for non-preemptable status is authenticated as to the source of the request, then the method 200 flows to step 216 where the NCS 120 marks the active call as non-preemptable. One technique to accomplish this marking is to update a call processing database 114. After the call is marked, then notification is provided throughout the calling network in step 218 as discussed previous above. Once again, the non-preemptable call status can be displayed at various receiver or monitoring nodes throughout the network at step 220. Notification can be issued from the NCS 120 as a control signal via a control channel, or the like, to the end point receiver stations to display that the active call has been marked as non-preemptable. Any display used anywhere in any node of the network may be notified. For example, a display of the remote phone 102 may be signaled as to the new status, a display of the NCS 120 can display the status, and a display of the authorized agency 118 can show the new call status. The active call continues to completion in step 222. Finally, upon call termination, the non-preemptable status of the call is cleared at every node upon termination of the call.

Figure 3:
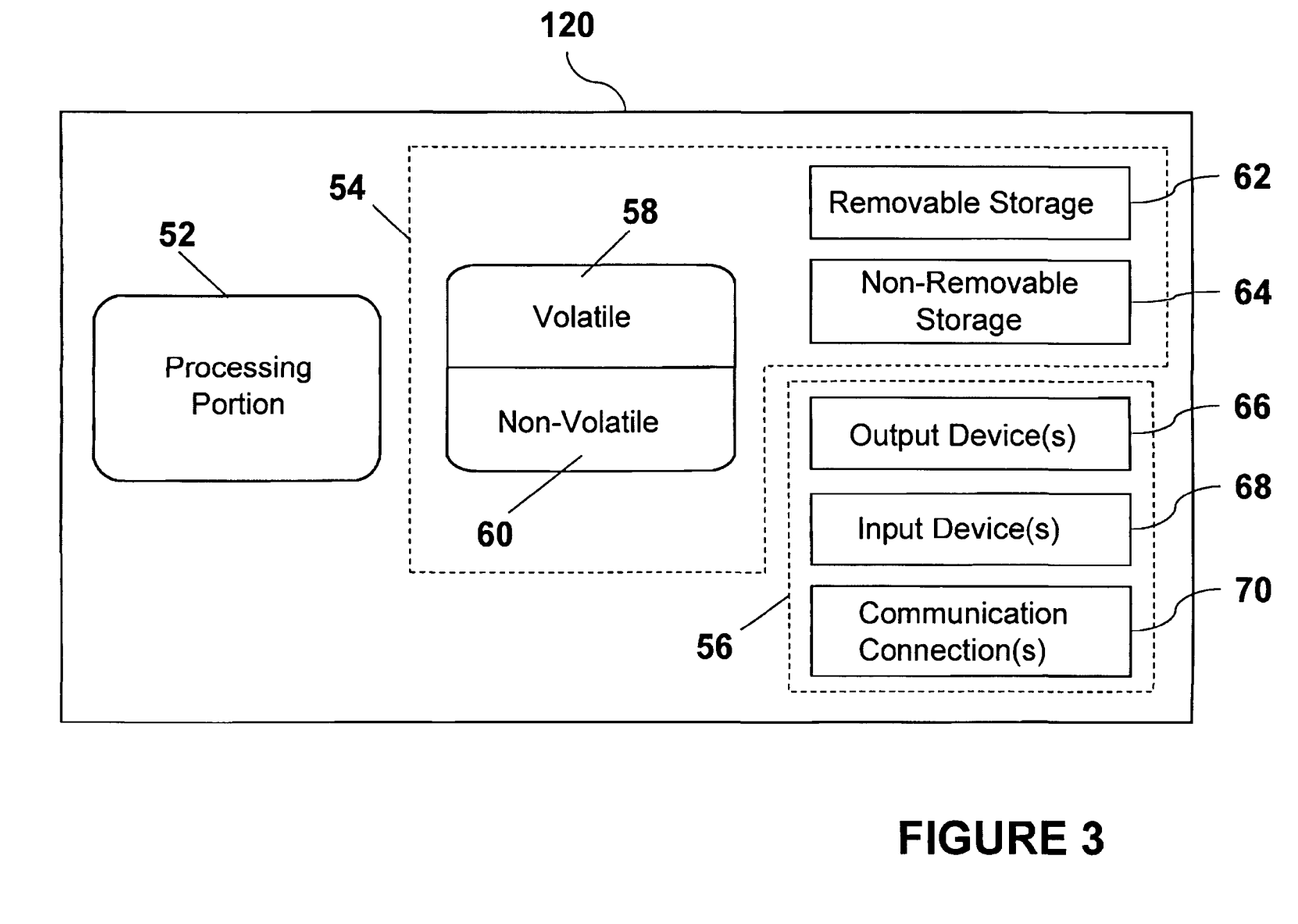
FIG. 3 is a block diagram of an example server for non-preemptable call status determination and identification.

FIG. 3 is a block diagram of an example server which can be used as the non-preemptable call server (NCS) 120. As described above, the NCS 120 receives requests to mark an active voice or data call as a non-preemptable call. In an example configuration of FIG. 3, the server includes a processor 60, a memory portion 62, and a communications section 64. It is emphasized that the block diagram depicted in FIG. 3 is exemplary and not intended to imply a specific implementation. Thus, the processor 60 can be implemented in a single processor or multiple processors. Multiple processors can be distributed or centrally located. Multiple processors can communicate wirelessly, via hard wire, or a combination thereof. The memory storage facility 62 may be inclusive of a database such as the call processing database 114 or may be for storage of information related to the non-preemptable call status. For example, the memory portion may include authentication storage. Alternately, the authentication may be a remote facility accessed via the communication portion 64. The communication portion 64 couples to the interfaces of the MSC 112 as well as the call processing database and authentication database (not shown) if separate from the server.

Depending upon the exact configuration, the memory portion 62 can include volatile (such as RAM) 66, non-volatile (such as ROM, flash memory, etc.) 68, or a combination thereof. The server 120 can have additional features/functionality. For example, the can include additional storage (removable storage 70 and/or non-removable storage 72) including, but not limited to, magnetic or optical disks, tape, flash, smart cards or a combination thereof. Computer storage media, such as in memory portion 62 may include volatile 66 and nonvolatile 68 memory, removable 70 and non-removable 72 storage media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 60. Any such computer storage media can be part of the server 120. The computer readable media having instructions which when executed can perform methods supporting the methods described with respect to FIG. 2.

The server 120 also can have input devices (not shown) such as keyboard, mouse, pen, voice input device, touch input device, and the like. Output devices (not shown) may also be includes such as a display, speakers, printer, and the like. Such input and output mechanisms are well known to those of skill in the art and they support the server 120 functionality.

The following description sets forth some exemplary telephony radio networks and non-limiting operating environments in which the identification and determination of non-preemptable calls can be implemented. The below-described operating environments should be considered non-exhaustive, however, and thus the below-described network architectures merely show how the identification of non-preemptable calls can be incorporated into existing network structures and architectures. It can be appreciated, however, that the marking of non-preemptable calls can be incorporated into existing and/or future alternative architectures for communication networks as well.

The global system for mobile communication ("GSM") is a widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of dynamic allocation of communications resources can be applied independently of the method for data transport, and do not depend on any particular network architecture, or underlying protocols.

Figure 4:
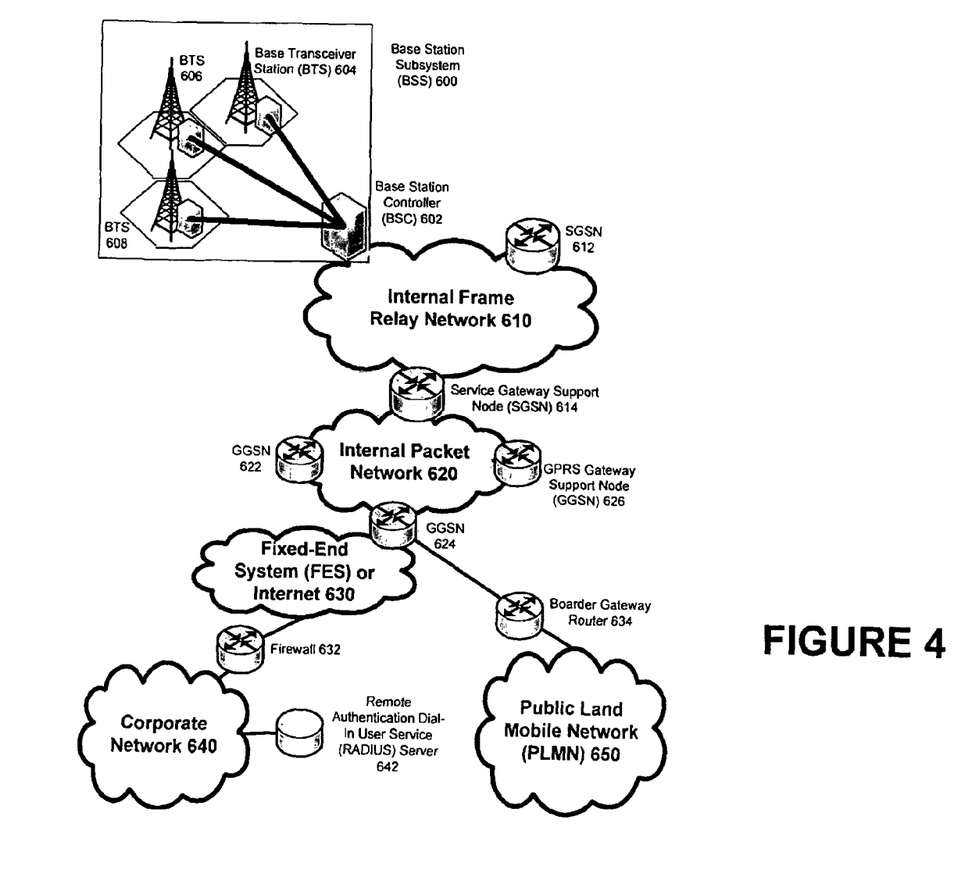
FIG. 4 depicts an overall block diagram of an exemplary packet-based mobile cellular network environment, such as a GPRS network, in which aspects of the invention can be practiced.

FIG. 4 depicts an overall block diagram of an exemplary packet-based mobile cellular network environment, such as a GPRS network, in which identification and establishment of non-preemptable calls may be practiced. In an example configuration, a wireless radio network and cellular radio network and towers are encompassed by the network environment depicted in FIG. 4. In such an environment, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, and the like are the access points where users of packet-based mobile devices (e.g., mobile device 12) become connected to the wireless network. In exemplary fashion, the packet traffic originating from user devices (e.g., user device 102) is transported via an over-the-air interface to a BTS 608, and from the BTS 608 to the BSC 602. Base station subsystems, such as BSS 600, are a part of internal frame relay network 610 that can include Service GPRS Support Nodes ("SGSN") such as SGSN 612 and 614. Each SGSN is connected to an internal packet network 620 through which a SGSN 612, 614, and the like can route data packets to and from a plurality of gateway GPRS support nodes (GGSN) 622, 624, 626. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630. As illustrated, subscriber corporate network 640 may be connected to GGSN 624 via firewall 632; and PLMN 650 is connected to GGSN 624 via border gateway router 634. The Remote Authentication Dial-In User Service ("RADIUS") server 642 may be used for caller authentication when a user of a mobile cellular device calls corporate network 640.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 5:
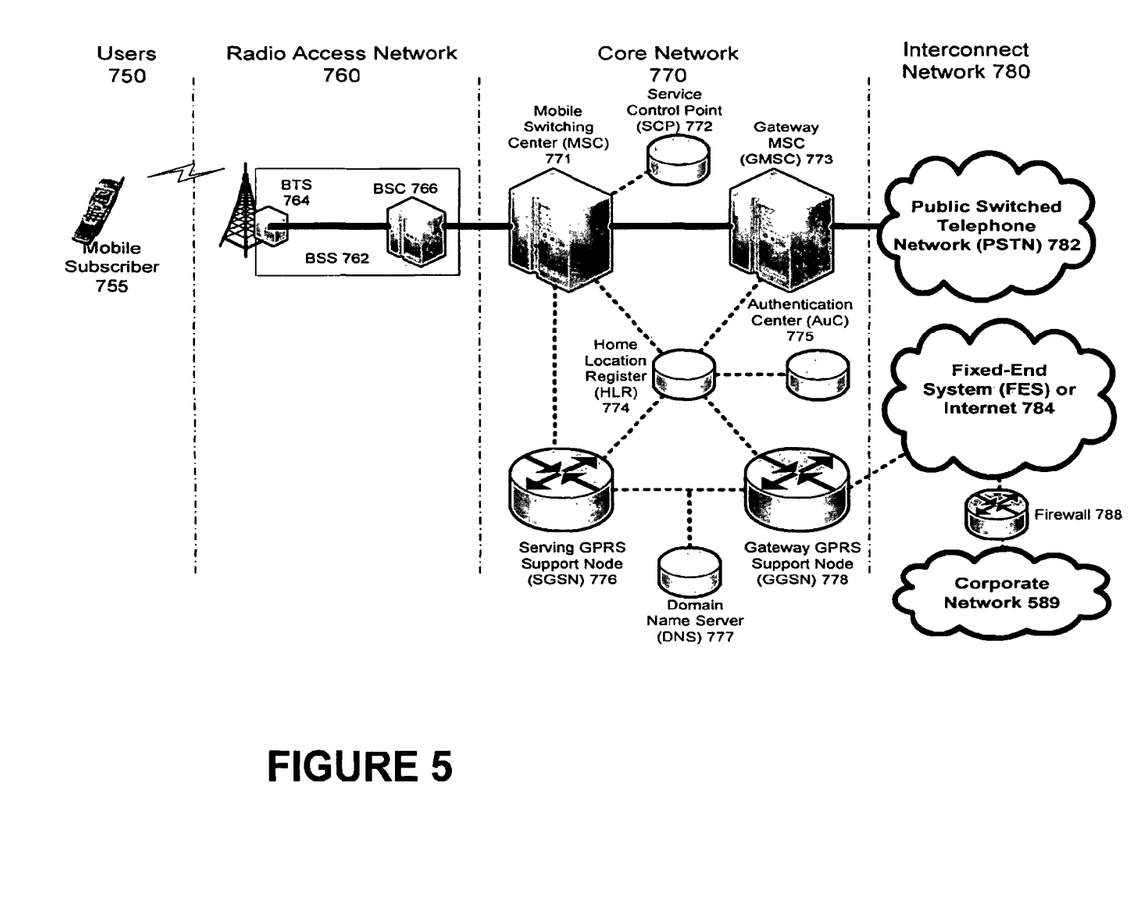
FIG. 5 illustrates an architecture of a typical GPRS network as segmented into four groups.

FIG. 5 illustrates an architecture of a typical GPRS network as segmented into four groups: users 750, radio access network 760, core network 770, and interconnect network 780. In an example configuration the cellular and wireless networks are encompassed by the radio access network 760, core network 770, and interconnect network 780. Users 750 comprise a plurality of end users (though only mobile subscriber 755 is shown in FIG. 5). In an example embodiment, the device depicted as mobile subscriber 755 comprises mobile devices. Radio access network 760 comprises a plurality of base station subsystems such as BSSs 762, which include BTSs 764 and BSCs 766. Core network 770 comprises a host of various network elements. As illustrated here, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 5, interconnect network 780 comprises Public Switched Telephone Network ("PSTN") 782, Fixed-End System ("FES") or Internet 784, firewall 788, and Corporate Network 789.

A mobile switching center can be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then sends the data traffic to GGSN 778 for further forwarding.

When MSC 771 receives call traffic, for example from BSC 766, it sends a query to a database hosted by SCP 772. The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user (e.g., requester and sometimes to the actual portable device, such as the mobile device used by an end user of the mobile cellular service. When a mobile subscriber turns on his or her mobile device, the mobile device goes through an attach process by which the mobile device attaches to an SGSN of the GPRS network. In FIG. 5, when mobile subscriber 755 initiates the attach process by turning on the network capabilities of the mobile device, an attach request is sent by mobile subscriber 755 to SGSN 776. The SGSN 776 queries another SGSN, to which mobile subscriber 755 was attached before, for the identity of mobile subscriber 755. Upon receiving the identity of mobile subscriber 755 from the other SGSN, SGSN 776 requests more information from mobile subscriber 755. This information is used to authenticate mobile subscriber 755 to SGSN 776 by HLR 774. Once verified, SGSN 776 sends a location update to HLR 774 indicating the change of location to a new SGSN, in this case SGSN 776. HLR 774 notifies the old SGSN, to which mobile subscriber 755 was attached before, to cancel the location process for mobile subscriber 755. HLR 774 then notifies SGSN 776 that the location update has been performed. At this time, SGSN 776 sends an Attach Accept message to mobile subscriber 755, which in turn sends an Attach Complete message to SGSN 776.

After attaching itself with the network, mobile subscriber 755 then goes through the authentication process. In the authentication process, SGSN 776 sends the authentication information to HLR 774, which sends information back to SGSN 776 based on the user profile that was part of the user's initial setup. The SGSN 776 then sends a request for authentication and ciphering to mobile subscriber 755. The mobile subscriber 755 uses an algorithm to send the user identification (ID) and password to SGSN 776. The SGSN 776 uses the same algorithm and compares the result. If a match occurs, SGSN 776 authenticates mobile subscriber 755.

Next, the mobile subscriber 755 establishes a user session with the destination network, corporate network 789, by going through a Packet Data Protocol ("PDP") activation process. Briefly, in the process, mobile subscriber 755 requests access to the Access Point Name ("APN"), for example, UPS.com (e.g., which can be corporate network 789 in FIG. 5) and SGSN 776 receives the activation request from mobile subscriber 755. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 can access the requested corporate network 789. The SGSN 776 then sends to GGSN 778 a Create Packet Data Protocol ("PDP") Context Request message that contains necessary information. The GGSN 778 sends a Create PDP Context Response message to SGSN 776, which then sends an Activate PDP Context Accept message to mobile subscriber 755.

Once activated, data packets of the call made by mobile subscriber 755 can then go through radio access network 760, core network 770, and interconnect network 780, in a particular fixed-end system or Internet 784 and firewall 788, to reach corporate network 789.

Thus, network elements that can invoke the functionality of dynamic allocation of communications resources can include but are not limited to Gateway GPRS Support Node tables, Fixed End System router tables, firewall systems, VPN tunnels, and any number of other network elements as required by the particular digital network.

Figure 6:
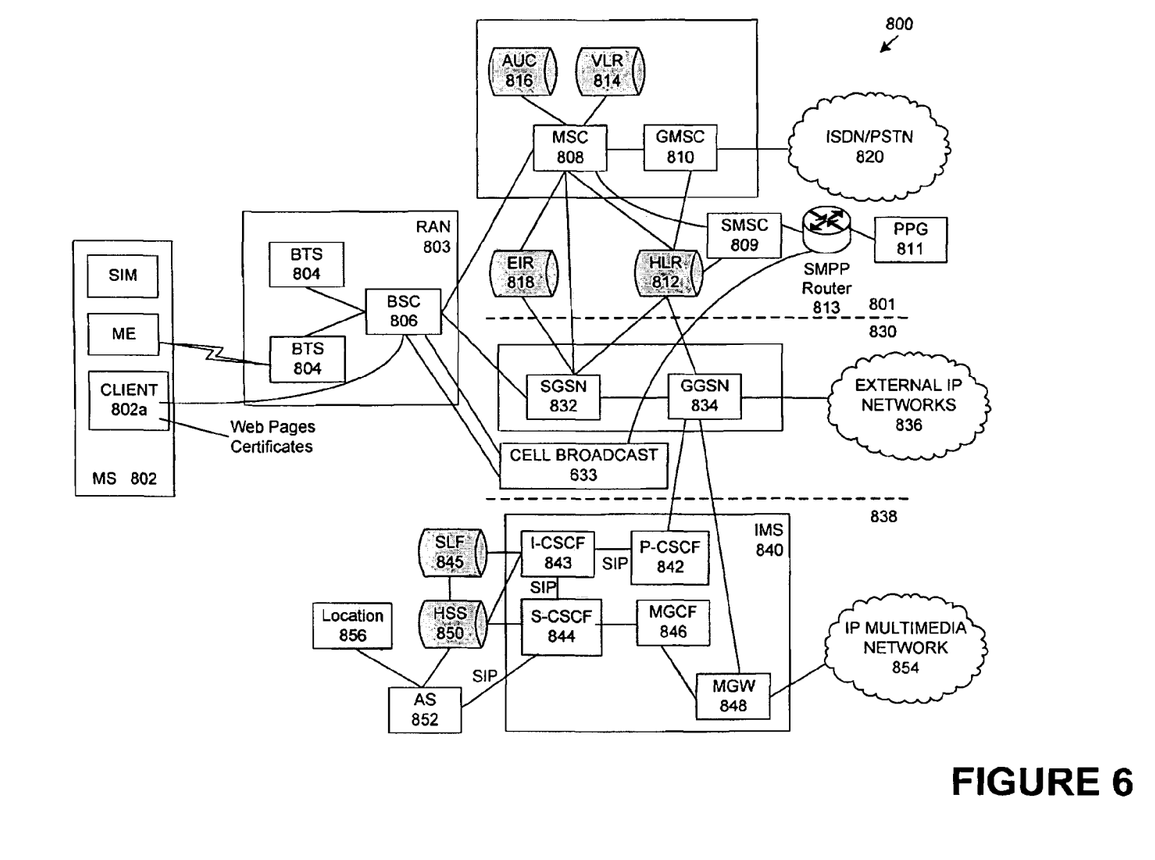
FIG. 6 illustrates an example alternate block diagram of an exemplary GSM/GPRS/IP multimedia network architecture in which aspects of the invention may be practiced.

FIG. 6 illustrates another exemplary block diagram view of a GSM/GPRS/IP multimedia network architecture 800 in which dynamic allocation of communications resources can be incorporated. As illustrated, architecture 800 of FIG. 6 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The MS 802 is physical equipment or Mobile Equipment (ME), such as a mobile phone or a laptop computer (e.g., mobile device 12) that is used by mobile subscribers, with a Subscriber identity Module (SIM). The SIM includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. Thus, the GMSC 810 provides interworking functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AuC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (i.e., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 833 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides interworking functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 830 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 838 was introduced with 3GPP Release 5, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification).

The I-CSCF 843, forms an entrance to a home network and hides the inner topology of the home network from other networks and provides flexibility for selecting an S-CSCF. The I-CSCF 843 may contact a subscriber location function (SLF) 845 to determine which HSS 850 to use for the particular subscriber, if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown). It also controls the media gateway (MGW) 848 that provides user-plane interworking functionality (e.g., converting between AMR- and PCM-coded voice). The MGW 848 also communicates with other IP multimedia networks 854.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of a system that performs identification and establishment of non-preemptable call status have been described in connection with various computing devices, the underlying concepts can be applied to any computing device or system where the principles of the claimed invention may be implemented. The various techniques described herein can be implemented in connection with hardware or software or, where appropriate, with a combination of both. Thus, the methods and apparatus for identification and establishment of non-preemptable call status, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing non-preemptable call status. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus that performs identification and establishment of non-preemptable call status also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing the claimed invention. When implemented on a general-purpose processor, the program code combines with the processor to provide a unique apparatus that operates to invoke the functionality that performs identification and establishment of non-preemptable call status. Additionally, any storage techniques used in connection with a system that performs identification and establishment of non-preemptable call status can invariably be a combination of hardware and software.

While a system that performs identification and establishment of non-preemptable call status have been described in connection with the various embodiments of the various figures, it is to be understood that other similar embodiments can be used or modifications and additions can be made to the described embodiment for performing the same function of dynamic allocation of communications resources without deviating therefrom. For example, one skilled in the art will recognize that a system that performs identification and establishment of non-preemptable call status as described herein may apply to any environment, whether wired or wireless, and may be applied to any number of devices connected via a communications network and interacting across the network. Therefore, the present invention should not be limited to any single embodiment, but rather should be construed in breadth and scope in accordance with the appended claims.

What is claimed is:

1. A method of preventing a high priority third party from prematurely terminating a call when network resources are at or near capacity, the method comprising:

initiating a call between a first party and a second party in a telecommunications system;

connecting the call between a device of a first party and a device of a second party, wherein the second party is a person authorized to manually mark the call non-preemptable for at least one of public safety purposes or emergency call purposes;

receiving a request that the call be designated as a non-preemptable call;

marking the call, while the call is in progress, with a non-preemptable call status, wherein marking the call with the non-preemptable call status comprises sending a signal to a main switching element in the telecommunications system requesting non-preemptable call status for the call;

propagating the non-preemptable call status to nodes and switching points in the telecommunications system, wherein:

non-preemptable call status acts to prevent the call from early termination by the high priority third party attempting to gain access to the network resources by establishing another call on the network; and non-preemptable call status acts to prevent the reallocation, to the high priority third party, of network resources being utilized by the call;

continuing call activity until the call is terminated by either the first party or the second party; and clearing the non-preemptable call status from the nodes and switching points in the telecommunications system.

2. The method of claim 1, wherein the call is one of a voice or a data call.

3. The method of claim 1, further comprising:

authenticating the second party as an authorized party, after the second party request and prior to marking the call with a non-preemptable call status.

4. The method of claim 1, further comprising displaying the non-preemptable call status at one or more of first party equipment, second party equipment, or nodes and switching equipment.

5. A system for preventing a high priority third party from prematurely terminating a call when network resources are at or near capacity, the system comprising:

a processor; and memory coupled to the processor, the memory comprising executable instructions that when executed by the processor cause the processor to effectuate operations comprising:

initiating a call between a first party and a second party in the system;

connecting the call between a device of a first party and a device of a second party, wherein the second party is a person authorized to manually mark the call non-preemptable for at least one of public safety purposes or emergency call purposes;

receiving a request that the call be designated as a non-preemptable call;

marking the call, while the call is in progress, with a non-preemptable call status, wherein marking the call with the non-preemptable call status comprises sending a signal to a main switching element in the system requesting non-preemptable call status for the call;

propagating the non-preemptable call status to nodes and switching points in the system, wherein:

non-preemptable call status acts to prevent the call from early termination by the high priority third party attempting to gain access to the network resources by establishing another call on the network; and non-preemptable call status acts to prevent the reallocation, to the high priority third party, of network resources being utilized by the call;

continuing call activity until the call is terminated by either the first party or the second party; and clearing the non-preemptable call status from the nodes and switching points in the telecommunications system.

6. The system of claim 5, the operations further comprising authenticating the second party as authorized to designate non-preemptable status on a call.

7. The system of claim 5, the operations further comprising propagating the non-preemptable status of the call to other nodes and switches in the system to prevent premature termination of the call by the high priority third party.

8. The system of claim 5, the operations further comprising receiving a signal request from the device of the second party establishing non-preemptable call status on the call.

9. A computer-readable storage medium, the computer-readable storage medium not being a propagating signal, the computer-readable storage medium comprising executable instructions that when executed by a processor cause the processor to effectuate operation for preventing a high priority third party from prematurely terminating a call when network resources are at or near capacity, the operations comprising:

initiating a call between a first party and a second party in a telecommunications system;

connecting the call between a device of a first party and a device of a second party, wherein the second party is a person authorized to manually mark the call non-preemptable for at least one of public safety purposes or emergency call purposes;

receiving a request that the call be designated as a non-preemptable call;

marking the call, while the call is in progress, with a non-preemptable call status, wherein marking the call with the non-preemptable call status comprises sending a signal to a main switching element in the system requesting non-preemptable call status for the call;

propagating the non-preemptable call status to nodes and switching points in the system, wherein:

non-preemptable call status acts to prevent the call from early termination by the high priority third party attempting to gain access to the network resources by establishing another call on the network; and non-preemptable call status acts to prevent the reallocation, to the high priority third party, of network resources being utilized by the call;

continuing call activity until the call is terminated by either the first party or the second party; and clearing the non-preemptable call status from the nodes and switching points in the telecommunications system.

10. The computer-readable storage medium of claim 9, the operations further comprising receiving a request from an authorized agency that the call be designated as a non-preemptable call.

11. The computer-readable storage medium of claim 10, the operations further comprising authenticating the received request before establishing the non-preemptable call status.

12. The computer-readable storage medium of claim 9, the operations further comprising displaying the non-preemptable call status regarding the call on at least one of a display of a the telecommunications server, a display of the device of the first party, or a display of the device of the second party.

* * * * *

UNITED STATES PATENT AND TRADEMARK OFFICE
CERTIFICATE OF CORRECTION

PATENT NO. : 8,442,203 B2  
APPLICATION NO. : 12/057029  
DATED : May 14, 2013  
INVENTOR(S) : DeWayne Allan Sennett and Brian Kevin Daly Page 1 of 1

It is certified that error appears in the above-identified patent and that said Letters Patent is hereby corrected as shown below:

In the Claims:

Column 15,
Claim 12, line 1, after "of a" delete "the".

Signed and Sealed this
Sixth Day of May, 2014

Michelle K. Lee
*Deputy Director of the United States Patent and Trademark Office*